(12) United States Patent
Bromberek

(10) Patent No.: US 8,857,884 B2
(45) Date of Patent: Oct. 14, 2014

(54) TARPING SYSTEM WITH DUAL SPRINGS

(76) Inventor: Robert Bromberek, Lemont, IL (US)

( * ) Notice: Subject to any disclaimer, the term of this patent is extended or adjusted under 35 U.S.C. 154(b) by 0 days.

(21) Appl. No.: 13/354,857

(22) Filed: Jan. 20, 2012

(65) Prior Publication Data

US 2012/0187712 A1    Jul. 26, 2012

Related U.S. Application Data

(60) Provisional application No. 61/434,702, filed on Jan. 20, 2011.

(51) Int. Cl.
*B60J 11/00* (2006.01)
*B60J 7/08* (2006.01)

(52) U.S. Cl.
CPC ........................................ *B60J 7/085* (2013.01)
USPC .................... 296/98; 296/100.14; 296/100.15

(58) Field of Classification Search
USPC .................................. 296/98, 100.14, 100.15
See application file for complete search history.

(56) References Cited

U.S. PATENT DOCUMENTS

| | | | | |
|---|---|---|---|---|
| 5,887,937 A | * | 3/1999 | Searfoss | 296/122 |
| 6,318,790 B1 | * | 11/2001 | Henning | 296/98 |
| 7,118,157 B1 | * | 10/2006 | Bromberek | 296/100.01 |

* cited by examiner

*Primary Examiner* — Dennis H Pedder
*Assistant Examiner* — Beverly Becker
(74) *Attorney, Agent, or Firm* — Heather A. Kartsounes

(57) ABSTRACT

This invention relates to a tarping system with dual springs that allow for constant and continuous pressure to be exerted on the tarp and tarp arms. Specifically, it relates to a tarping system comprising a tarp capable of being unrolled to cover said transport container or rolled to uncover said container, a movement means supplying power to said tarping system, at least two springs positioned at the same angle along a shaft, and two arms joined to said tarp at one end and shaft at the other end.

16 Claims, 7 Drawing Sheets

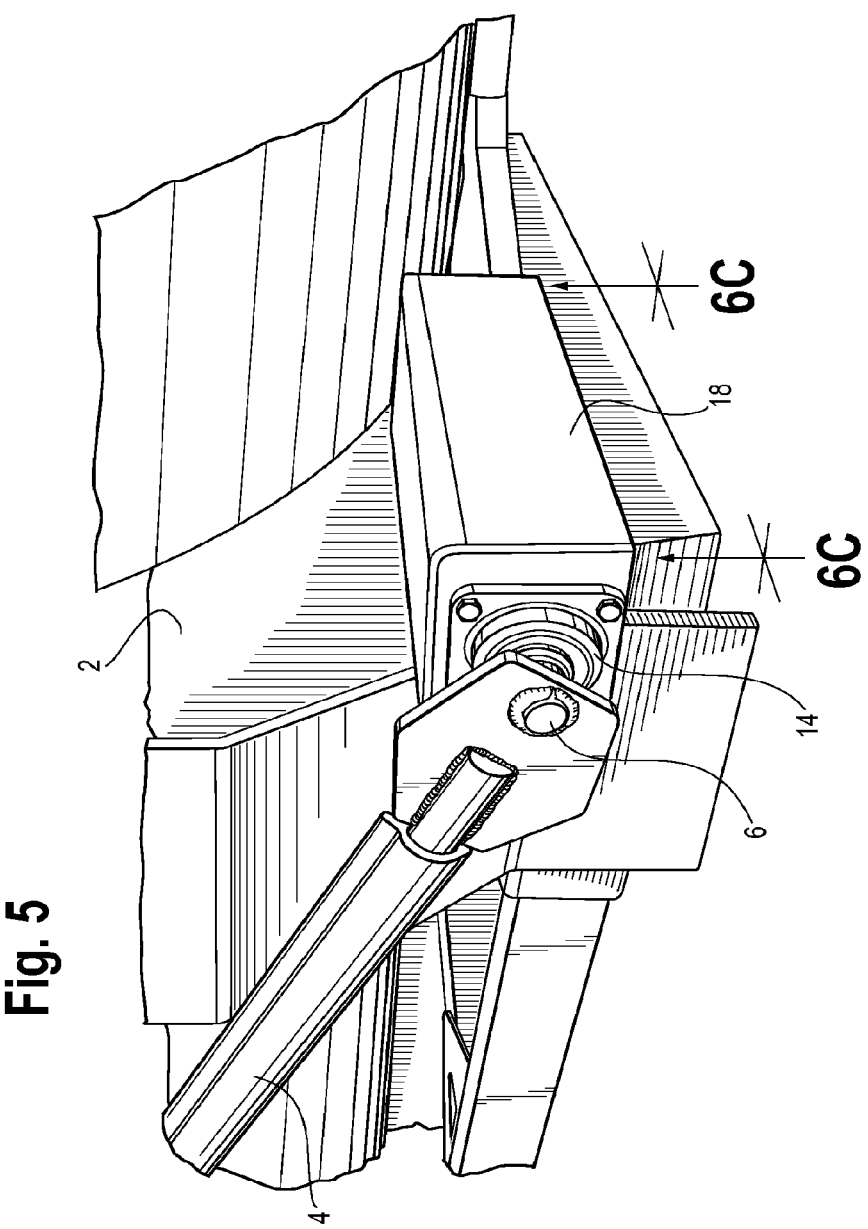

TARPING SYSTEM WITH DUAL SPRINGS

CROSS-REFERENCE TO RELATED APPLICATIONS

This application claims priority from an earlier filed U.S. Provisional Application, entitled Tarping System with Dual Springs, U.S. Application No. 61/434,702 filed on Jan. 20, 2011.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A COMPACT DISC

Not Applicable.

BACKGROUND OF THE INVENTION

This invention relates to a covering system for containers. More specifically, it relates to a tarping system with dual springs that allow for constant and continuous pressure to be exerted on the tarp and tarp arms.

Transport containers, especially those used on trucks to haul large loads are typically open at the top. Being open at the top makes the transport containers easier to fill. However, while they may be easier to fill, these transport containers are also prone to losing part of the load while the vehicle is traveling. Debris can escape causing possible damage to other vehicles or other safety concerns. As a result, these transport containers must be covered.

Many transport containers are covered by large tarps that hold the load in place. Some of these tarps must be fitted manually to a transport container using a system of fasteners and ropes and other ties. This manual process of applying a cover to a transport container is very difficult and time consuming. A user often times will struggle to cover a load that is very large. This manual process can also be dangerous for a user and many safety concerns are realized while utilizing a manual process. Furthermore, a user must physically tighten the ties to ensure that the tarp is secure. This method of covering a transport container is simply too labor intensive and grueling for most users. As a result, covering systems utilizing a mechanical method have been developed to meet a growing demand.

Many of the mechanical covering systems utilize varying types of automatic systems to unroll a tarp over the transport container. Some systems utilize telescopic arms that unroll a tarp over a transport container as the arms expand. These same arms can then contract to roll the tarp when it is not needed. Other systems use straight arms that bend at a joint to either unroll or roll a tarp as needed. Many of these systems utilize springs to help drive the arms to roll or unroll over a transport container. However, while these systems save a user time in covering a transport container, they do not work well when covering large transport containers, namely container in excess of 40 feet in length. What tends to happen while covering larger transport container is that the arms, whose movement is dependant on springs, must be increasingly long in length and are difficult to move due to their size. The springs become overloaded and lose tension and no longer are able to handle the load placed on them. The motors and springs that power the motion of the arms struggle to maintain constant and continuous pressure on the tarp and arms over the length of the container and are prone to failure. Failure may be realized in the inability to move the tarp arms and/or the tarp arms bowing outward into a position that is no longer suitable for covering the transport container. This causes the system to not be appropriate to use on these larger transport container or for use on transport containers which fall in the low-sided gondola category.

A potential solution to this problem has been to add a joint or pivot point to the tarp arms so that there is an additional point to relieve some of the weight and pressure of the springs moving such a large and heavy tarping system. Another solution has been to add an arm and crossover assembly to further support the tarp arms. This arm and crossover assembly will aid the tarp arms in flipping back over the transport container when the springs are too overloaded to handle the weight load. A problem with this solution is that the arm and crossover assembly has been deemed too dangerous and prone to failure and many users avoid using this solution. Yet another solution is to simply add more and more springs positioned at the same angle to allow for more strength and therefore a higher weight load. The problem with this solution is that there is limited space on a transport container and at some point there is physically no more room to add another spring and in extra large transport containers, the springs still fail and are unable to pull the tarp arms up.

This invention solves all of these above mentioned problems. This invention comprises a tarping system utilizing dual springs for movement of the tarp arms therefore covering or uncovering the tarp in a manner that allows for uniform and constant pressure on the arms for smooth tarping of the transport container. In particular, this invention allows for the covering and uncovering of long containers, up to 53 feet long, as well as low-sided gondola transport containers, in a manner that keeps constant pressure on the tarping system. This and other advantages will be fully realized in more detail below.

BRIEF SUMMARY OF THE INVENTION

This invention relates to a tarping system for a transport container comprising
   a tarp capable of being unrolled to cover said transport container or rolled to uncover said container;
   a movement means supplying power to said tarping system;
   at least two springs positioned at the same angle along a shaft; and
   two arms joined to said tarp at one end and shaft at the other end.

It is anticipated that the tarp will comprise of a mesh material, however one skilled in the art will recognize that other materials are suitably appropriate depending on conditions the tarping system is experiencing. The tarp is to be located at one end of the transport container, preferably the front end, and is capable of being rolled or unrolled over the transport container. The tarp is connected to a tarp shaft to assist in the rolling/unrolling of the tarp over the transport container. The shaft's movement may be powered by the movement means by way of a connection so that its operation complements the movement of the arms. When the tarp is rolled, it is stored in a position over the transport container, preferably in a housing.

The arms are preferably straight and long enough that they can extend to the length of any size transport container. However, one skilled in the art will recognize that the arms at a minimum have to be moveable across the length of the transport container. The arms are connected to a shaft and move as the shaft rotates.

The shaft's movement is powered by the movement means. This movement means comprises an electric motor and controller_but one skilled in the art will recognize that any number of movement means are anticipated, such as a hydraulic pump, a battery powered motor, a hand crank, etc. The movement means causes the shaft to rotates which in turn raises or lowers the arms and in turn causes the springs to tense or relax.

This invention relies on the use of two or more springs to exert continuous and constant pressure on the tarp and arms. Springs have a number of active coils depending on that springs design. Springs have the tendency to lose their strength and tension as they are rotated or compressed. This invention is an improvement over existing solutions to tarping systems, particularly those systems on long transport containers, in that it utilizes two or more springs positioned along a shaft at the same angle so that the force exerted on the coils is always constant and continuous. As one spring reaches highest tension point, the other spring takes over to maintain continuous force exerted on the tarp arms. In this preferred embodiment, a spring loses tension and strength as it contracts past 90 degrees.

For purposes of describing this invention, it is anticipated that two springs are utilized but one skilled in the art will recognize that more then two springs are possible if needed depending on the circumstances. It is also anticipated that the springs along the shaft are centrally located underneath the transport container. A preferred embodiment will further house the springs inside of a housing. In an example of a high sided transport container, when a tarp is fully extended over the length of a transport container, the tarp arms are located at approximately a 45 degree angle to the springs along a shaft and the first spring is partially tense. For purposes of describing the tension positions, it will be described in terms of positions along a clock. At this 45 degree angle, the first spring is tense to a 2 hour position of tension while the second spring is in its relaxed state. In a low sided gondola transport container, the tarp arms begin at a lower position at about a 30 degree angle to the springs along the shaft and the first spring is partially tense at about a 1 hour position while the second spring is in its relaxed state. When the tarp is fully extended over the transport container, the torque of the movement means is the greatest as it is up against gravity holding the tarp arms down, the weight of the arms and tarp material, and the angle of the tarp arms. As the tarp arms move upward to the first spring continues to tense while the second spring remains in its relaxed state. In a high sided transport container, the first spring will tense to about 3 hours of tension at approximately 60 degrees from the springs along the shaft, while a low sided gondola will pass through 45 degrees at 2 hrs of tension before reaching 3 hours of tension at 60 degrees. Even at this position, the first spring is able to maintain its weight load by adding continuous pressure to the tarp arms. As the tarp arms continue to rise to wards 90 degrees, a position of 4 hours of tension will be reached on the first spring. At this point, the second spring begins to tense as the first spring has reached its maximum strength. As the tarp arms pass through 90 degrees, the first spring loses tension while the second spring takes over supporting the tarp and tarp arms. As the tarp arms approach 90 degrees, it is important that the springs not have too much tension so that arms bow outward. It is also important that the springs have a minimum tension needed to prevent the tarp from catching wind and raising the tarp. One skilled in the art will recognize that each transport container may have its individual spring tension needs to meet this balance as each situation will vary on factors such as the weight of the tarp and tarp arms, gravity, and angle.

As the first spring loses strength, the second spring contracts adding the lost tension from the first torsion spring so that continuous pressure is exerted on tarp arms. As the spring passes through 90 degrees and approaches approximately 120 degrees, the first spring tenses to a position of 5 hours while the second spring tenses to 2 hours. The first spring continues to lose tension while the second spring gains tension as the tarp arms continue in a downward motion. On a high sided transport container, the tarp arms are completely raised exposing the contents of the transport container at approximately 150 degrees from the springs along the shaft. The first spring is tense to about 6 hours while the second spring is tense to 3 hours at this position. In the situation of a low sided gondola transport container, the tarp arms continue to move to approximately 170 degrees until the tarp arms fully expose the contents of the transport container. At this position, the first spring is tense to 7 hours while the second spring is tense to 4 hours.

As the tarp arms move downward from 90 degrees, torque is not a factor as the movement means is strong enough to control the tarp arm movement. However, as the tarp arms pass through this position, controlling the tarp arms in light of gravity, the weight of the tarp and tarp arms, and wind continue to be an issue which is why continuous and constant pressure is imperative.

Without the second spring, once the tarp arms are at 90 degrees from the springs along the shaft, it would have lost nearly half its strength and does not have enough strength to return the tarp arms to their initial starting position. If the springs have too much tension, the motor will not be able to wind and pull the tarp arms up. Constant adequate tension is required for keeping the tarp taut and returning the tarp arms to their original closed position.

In its preferred embodiment, the housing will house the springs and also the shaft and bearings. By utilizing a housing, a user can control where the fixed end of both springs is located. Over time, due to use and exposure to the elements, springs lose tension. By using a housing that allows a user to control where the fixed end of the spring is located, the fixed end position can be changed and will give the spring a new lifespan and also gives a user the option to increase or decrease spring tension. The housing will utilize a drop out feature to make it easy to remove or repair all components (bearings, bolts) held within.

In its preferred embodiment, this invention will also comprise a remote control to remotely control the movement of the tarping system. This gives a user a certain level of flexibility while operating the tarping system since the user does not have to physically be in the direct vicinity of the tarping system. However, one skilled in the art will recognize that a remote control is not the only mode of controlling movement of the tarping system. Certain embodiments may also utilize control located on the transport container or the vehicle that hauls a transport container.

In an alternate arrangement of this invention, a series of springs can be arranged in a manner so that they are "clocked" at different angles along a shaft. For example, a series of four springs may be aligned along a shaft with a first spring positioned at twelve o'clock, a second spring positioned at three o'clock, a third spring positioned at six o'clock, and a fourth spring positioned at nine o'clock. This is an improvement over existing solutions in that when the springs are arranged at varying angles as one spring loses its tension, the next spring in the series will take over to ensure a constant pressure is exerted on the tarp arms.

BRIEF DESCRIPTION OF THE SEVERAL VIEWS OF THE DRAWINGS

Preferred features of the present invention will now be described with particular reference to the accompanying drawings. However, it is to be understood that the features illustrated in and described with reference to the drawings are not to be construed as limiting on the scope of the invention.

FIG. 5 is a side view of the tarping system, detailing the housing.

DETAILED DESCRIPTION OF THE INVENTION

Figure 1:
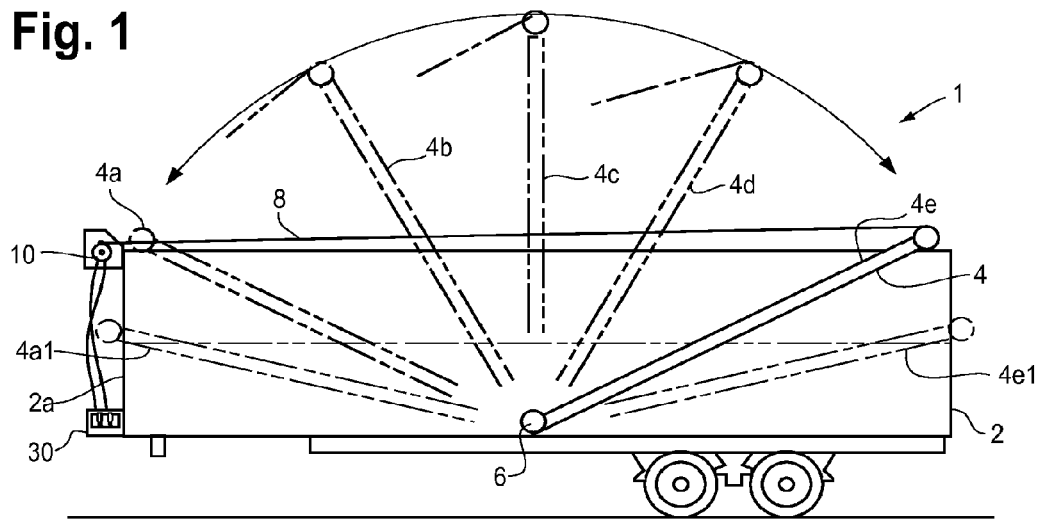
FIG. 1 is a side view of the transport container wherein the arms are depicted as moving from a rolled position to an unrolled position as the shaft rotates. Positions along both a high side transport container and a low side transport container are depicted.
Figure 2:
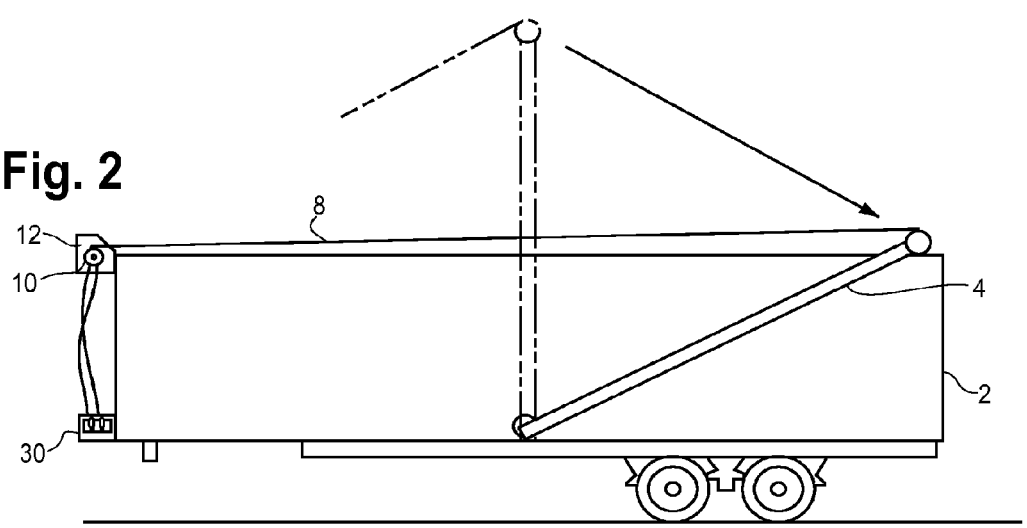
FIG. 2 is a side view of the transport container with the tarp in the fully deployed position.
Figure 3:
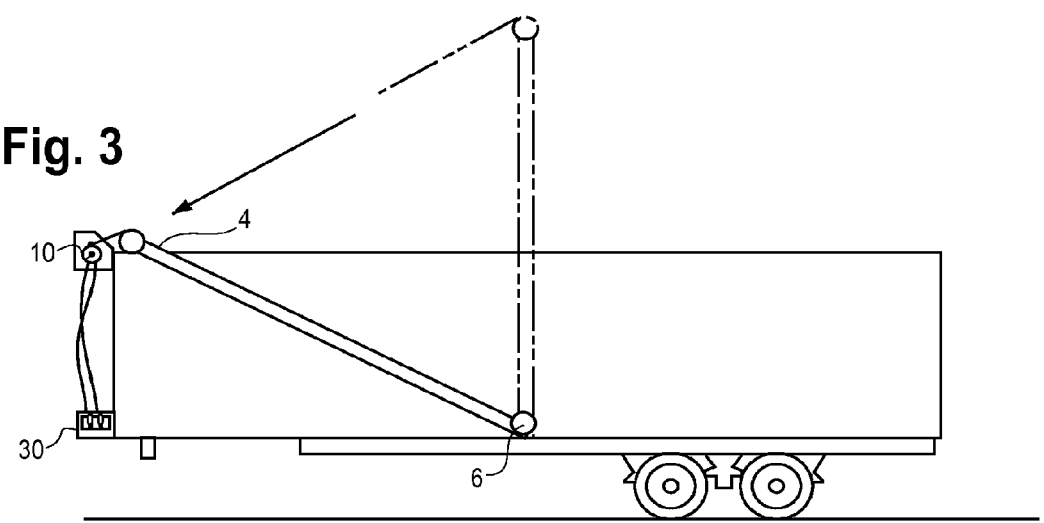
FIG. 3 is a side view of the transport container with the tarp in the rolled, not deployed position.

Turning to FIG. 1, this invention is depicted in a variety of positions along its movement path. Namely, the arms 4 are shown in a resting position 4a in a high side transport container 2 and 4a1 in a low side transport container 2a (tarp 8 not over the transport container 2) and are tracked along the arcing path as seen in 4b, 4c, and 4d until the arms 4 reach the fully deployed position 4e in a high side transport container and 4e1 in a low side transport container.

When a user wishes to roll tarp 8 over the transport container 2 to expose the contents in a transport container, the movement means 30 is activated and this activation causes movement of the shaft 6. As the shaft 6 rotates counter-clockwise, the springs 16a and 16b begin their path of movement. In an example of a high sided transport container 2, when a tarp 8 is fully extended over the length of a transport container 2, the arms 4 are located at approximately a 45 degree angle to the springs 16 and 16b along a shaft 6 and the first spring 16a is partially tense while the second spring 16b is in its relaxed state. In a low sided gondola transport container 2a, the arms 4 begin at a lower position, seen as 4e1, at about a 30 degree angle to the springs along the shaft and the first spring is partially tense while the second spring is in its relaxed state. As the arms 4 move upward to position 4d to 4c, the first spring 16a continues to tense while the second spring 16b remains in its relaxed state. As the tarp arms continue to rise to upwards and reach 90 degrees, the second spring 16b begins to tense as the first spring 16a has reached its maximum strength. As the tarp arms pass through 90 degrees, the first spring 16a loses tension while the second spring 16b takes over supporting the tarp 8 and arms 4. As the first spring 16a loses strength, the second spring 16b contracts adding the lost tension from the first spring 16a so that continuous pressure is exerted on arms 4 throughout its path (positions 4e to 4a in a high side transport container 2 and 4e1 to 4a1 in a low side transport container). The first spring 16a continues to lose tension while the second spring 16b gains tension as the arms 4 continue in a downward motion.

To assist in rolling the tarp 8, a tarp shaft 10 may also be powered by the movement means 30. This tarp shaft 10 rotates to complement the movement of the arms 4 so that the tarp 8 is rolled as the arms 4 lift. When the tarp 8 is fully rolled, it may be housed in tarp housing 12.

To deploy a tarp 8, the above described action is reversed. The shaft 6 reversed direction and rotates in a manner to raise the arms clockwise. Spring 16b is partially tense while spring 16a is in its relaxed state. As the arms 4 move upward to position 4b to 4c, the second spring 16b continues to tense while the second spring 16a remains in its relaxed state. As the tarp arms continue to rise to upwards and reach 90 degrees, the first spring 16a begins to tense as the second spring 16b has reached its maximum strength. As the tarp arms pass through 90 degrees, the second spring 16b loses tension while the first spring 16a takes over supporting the tarp 8 and arms 4. As the second spring 16b loses strength, the first spring 16a contracts adding the lost tension from the second spring 16b so that continuous pressure is exerted on arms 4 throughout its path (positions 4a-4e in a high side transport container 2 and 4a1-4e1 in a low side transport container). The second spring 16b continues to lose tension while the first spring 16a gains tension as the arms 4 continue in a downward motion. Once deployed, the tarp 8 may be tied down to the transport container 2 to fully secure the tarp.

When a user wishes to deploy the tarp 8 to cover the inside of the transport container 2, the above description is reversed. The movement means 30 rotates the shaft 6

Figure 6A:
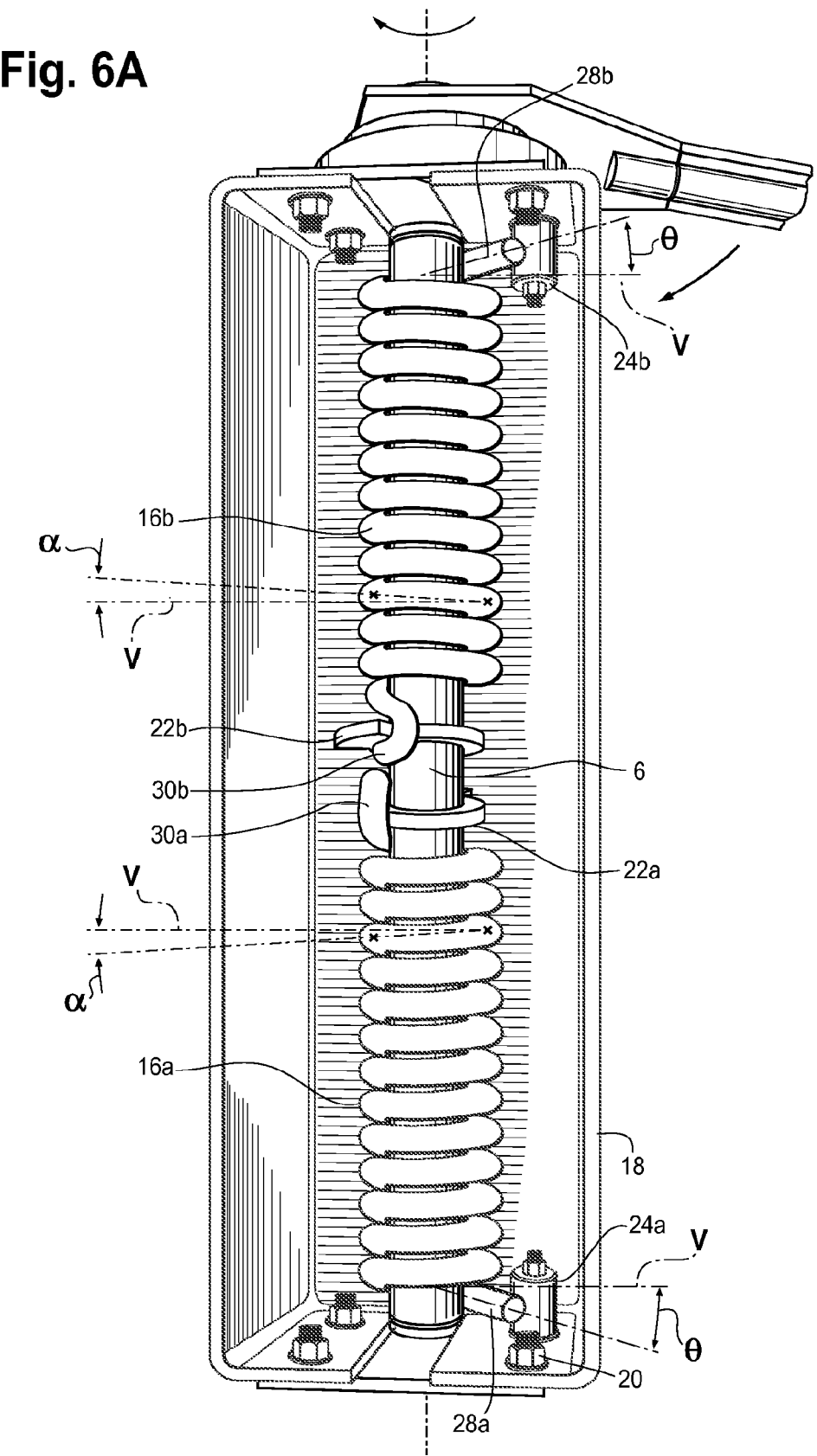
FIG. 6A is an underside view of the tarping system springs in the closed position wherein the stationary ends (stops) are located at the same angular position relative to the shaft and the springs are at rest in the same angular position relative to the shaft.
Figure 6B:
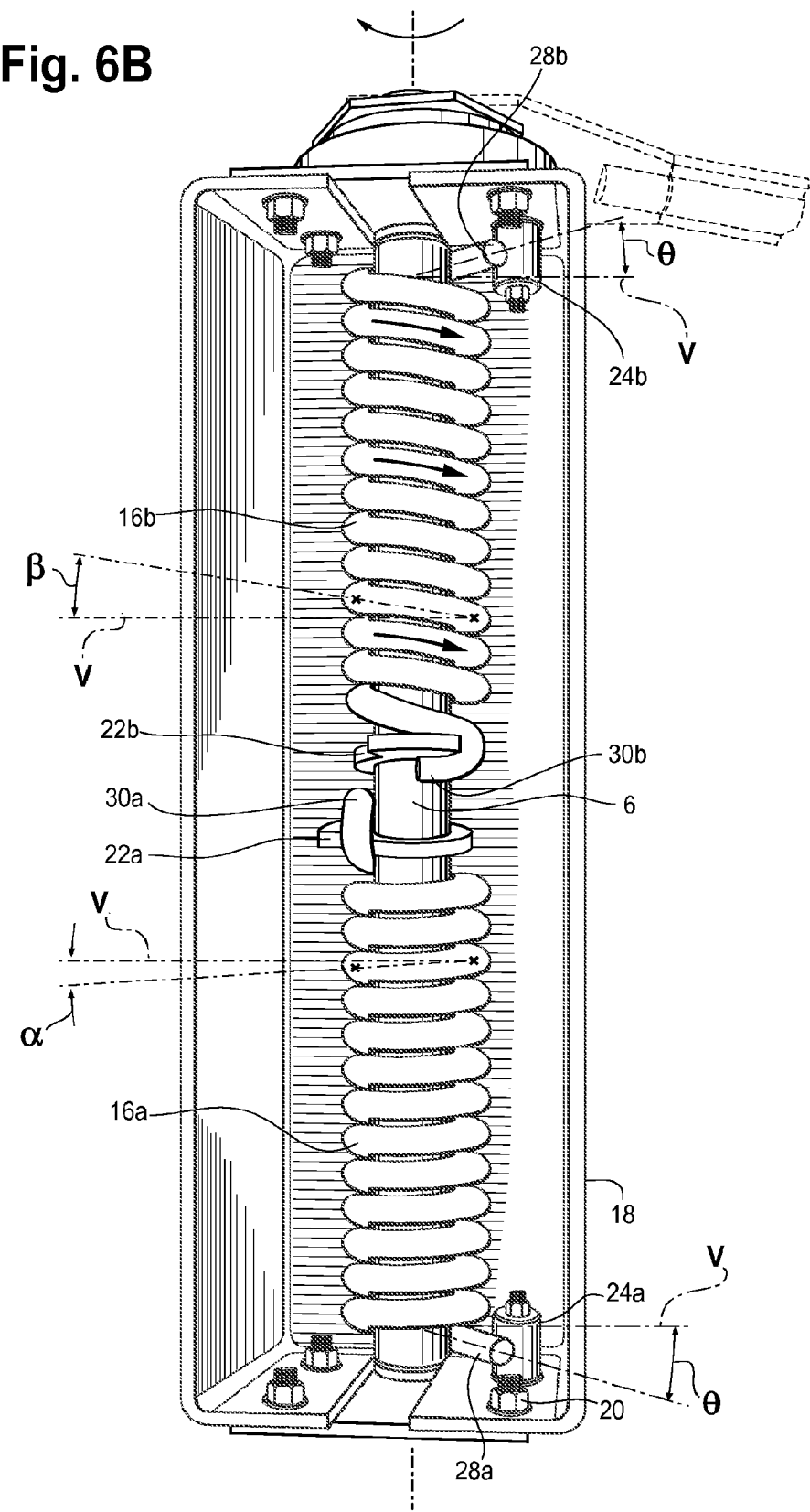
FIG. 6B is an underside view of the tarping system springs with the stationary ends (stops) are located at the same angular position relative to the shaft and the first spring has started to compress while the second spring is still at rest.
Figure 6C:
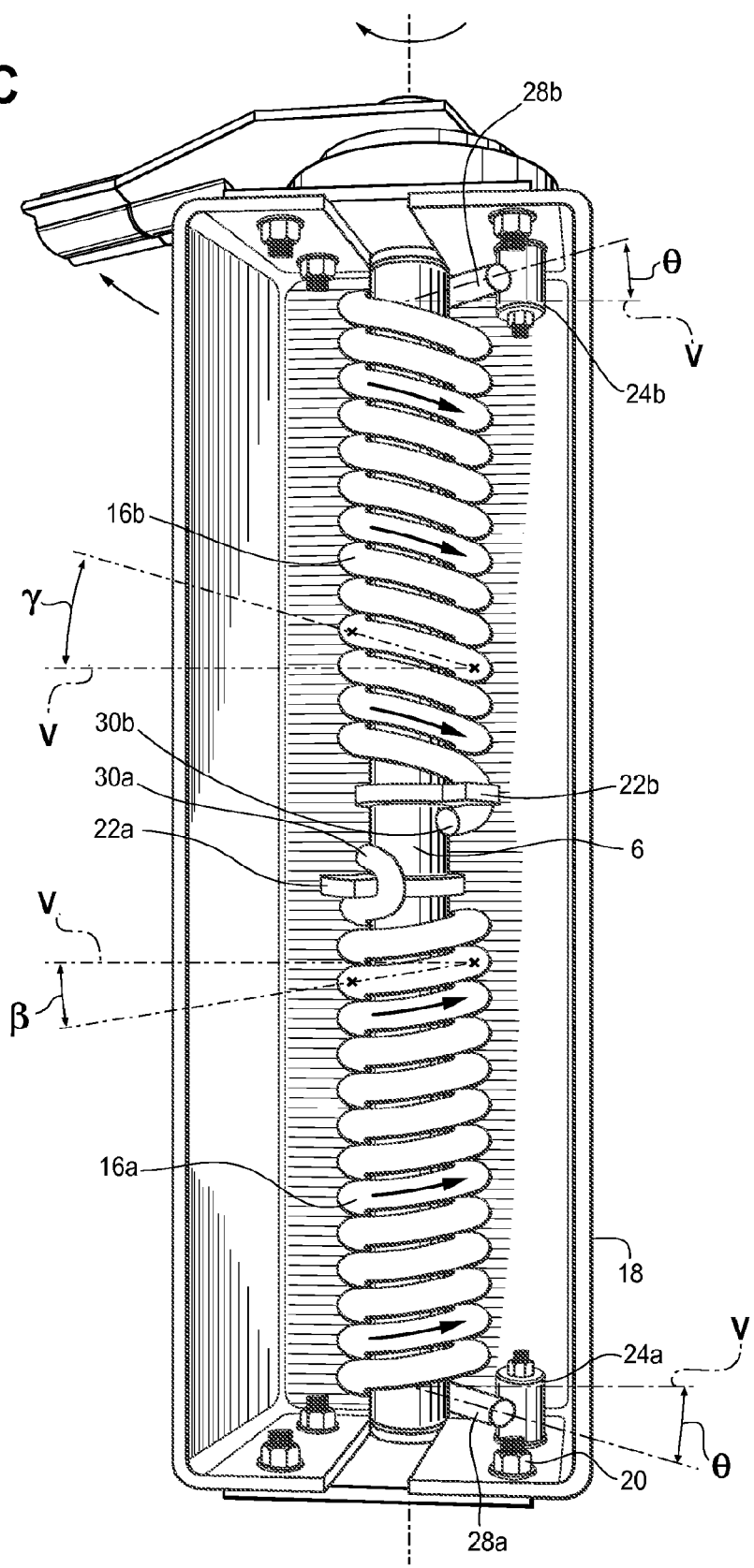
FIG. 6C is an underside view of the tarping system springs wherein the stationary ends (stops) are located at the same angular position relative to the shaft where both springs are compressing with the first spring compressed to a greater degree of angle relative to the shaft than the second spring. This figure depicts when the first spring is compressed to a position that has raised the arms to about 90 degrees and the second spring begins to take over to fully deploy the tarp arms.

Turning to FIGS. 6A-6D, the details of the spring arrangement is seen. Spring 16a and 16b are located along the shaft 6. In FIG. 6A, the springs 16a and 16b are located at the same angle ($\alpha$) along the shaft 6. The reactionary end of the springs 32a, 32b are affixed to a corresponding tab 22a, 22b while the stationary end of the springs 28a, 28b are affixed against a corresponding stop 24a, 24b. FIGS. 6A-6C depict the stationary ends 28a, 28b located at the same angular position ($\Theta$) relative to the shaft. FIG. 6B depicts the springs as one spring 16b begins to compress while the other spring 16a is still at rest. As compression occurs, the reactionary end 32b moves along with tab 22b. At this stage one spring 16b is at a different angular position ($\beta$) from the other spring 16a which is still at rest ($\alpha$). FIG. 6C. As spring 16b continues to compress and the tarp arms 4 raise and approach a ninety degree position, the other spring 16a begins to compress to continue raising the tarp arms 4 to their fully deployed position. FIG.

6C depicts this arrangement when spring 16b is fully compressed (γ) and 16a is partially compressed (β). In order to uncover the container 2, the above process is reversed. One skilled in the art will recognize that any angular position is desired depending on individual circumstances so long as the springs 16a, 16b compress separately.

Figure 6D:
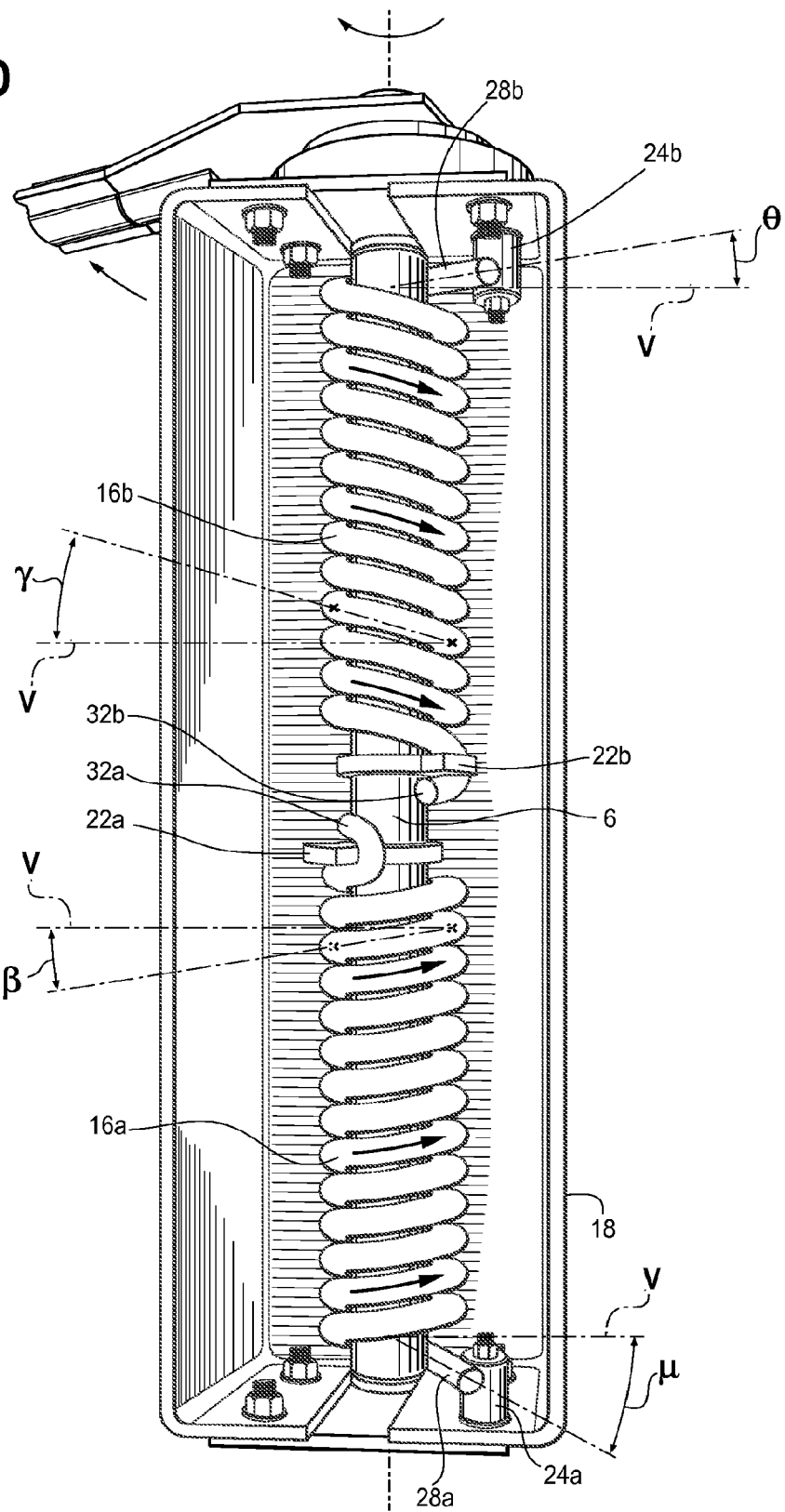
FIG. 6D is an underside view of the tarping system springs wherein the stationary ends (stops) are located at a different angular position relative to the shaft where both springs are compressing with the first spring compressed to a greater degree of angle relative to the shaft than the second spring.

FIG. 6D depicts the situation where the stationary ends 28a, 28b are located at a different angular position (μ, ⊖ respectively). The operation of the springs 16a, 16b operates in a similar manner as described above. The springs 16a and 16b continue to compress separately as the tarp arms 4 are raised or lowered.

Figure 4:
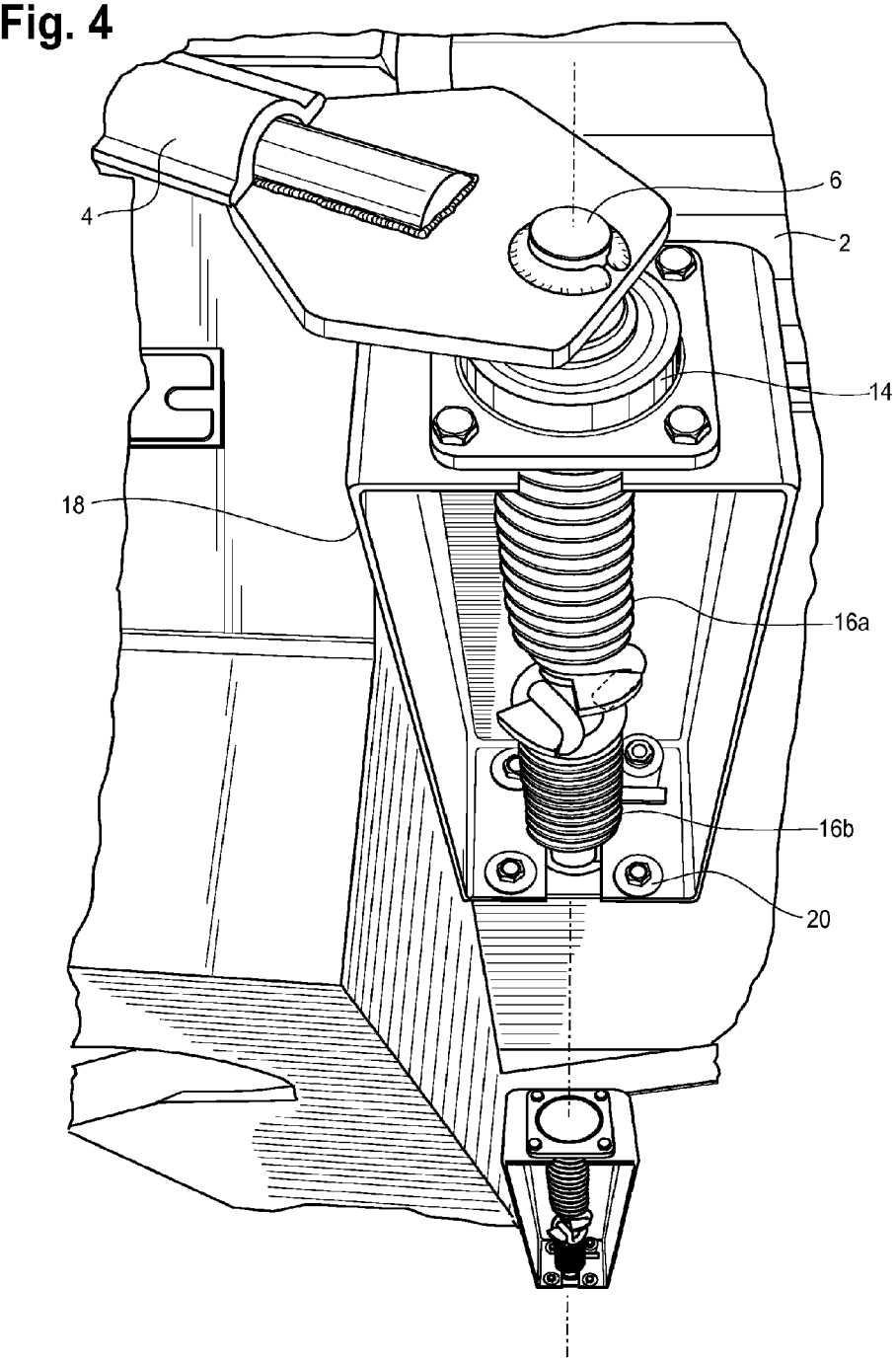
FIG. 4 is a side underside view of the tarping system depicting the springs and shaft contained in the housing.

This arrangement of the springs 16a, 16b along the shaft 6 is housing in a housing 18. The housing is bolted to the transport container 2 by way of bolts 20, seen in FIGS. 4 and 5.

The arms 4 are connected to the shaft 6 by way of bearings 14. As the shaft 6 rotates, the arms 4 achieve a position along their pre-determined path.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

What is claimed is:

1. This invention relates to a tarping system for a transport container comprising
    a tarp capable of being unrolled to cover said transport container or rolled to uncover said container;
    a movement means supplying power to said tarping system;
    at least two springs each having a reactionary and stationary end positioned separately and the stationary ends are located at the same angle relative to a shaft; wherein a first spring and a second spring are compressed separately along the shaft; and
    two arms joined to said tarp at one end and shaft at the other end;
wherein the reactionary end is a tab and the stationary end is a stop; and
wherein the first spring loses compression as movement means powers said arms to move and unroll said tarp over said transport container; as said first spring reaches ninety degrees of rotational compression from its reactionary end starting point, the first spring stops losing compression the second spring begins losing compression ensuring constant and continuous pressure on said arms.

2. This invention relates to a tarping system for a transport container comprising
    a tarp capable of being unrolled to cover said transport container or rolled to uncover said container;
    a movement means supplying power to said tarping system;
    at least two springs each having a reactionary and stationary end positioned separately and the stationary ends are located at the same angle relative to a shaft; wherein a first spring and a second spring are compressed separately along the shaft; and
    two arms joined to said tarp at one end and shaft at the other end;
wherein the reactionary end is a tab and the stationary end is a stop; and
wherein said second spring compresses as movement means powers said arms to move and roll said tarp exposing contents within with said transport container; as said second spring reaches ninety degrees of rotational compression from its reactionary end starting point, said first spring compresses.

3. The tarping system as in claim 1 further comprises a remote control.

4. The tarping system as in claim 1 wherein the spring and shaft are contained within a housing.

5. The tarping system as in claim 1 wherein the tension of the spring is adjustable.

6. This invention relates to a tarping system for a transport container comprising
    a tarp capable of being unrolled to cover said transport container or rolled to uncover said container;
    a movement means supplying power to said tarping system;
    at least two springs each having reactionary and stationary ends, said stationary ends positioned at varying angles relative to a shaft;
        wherein a first spring and a second spring are compressed separately along the shaft; and
    two arms joined to said tarp at one end and shaft at the other end;
wherein the reactionary end is a tab and the stationary end is a stop; and
wherein said first spring loses compression as movement means powers said arms to move and unroll said tarp over said transport container; as said first spring reaches ninety degrees of rotational compression from its reactionary end starting point, the first spring stops losing compression the second spring begins losing compression ensuring constant and continuous pressure on said arms.

7. This invention relates to a tarping system for a transport container comprising
    a tarp capable of being unrolled to cover said transport container or rolled to uncover said container;
    a movement means supplying power to said tarping system;
    at least two springs each having reactionary and stationary ends, said stationary ends positioned at varying angles relative to a shaft;
    wherein a first spring and a second spring is are compressed separately along the shaft; and
    two arms joined to said tarp at one end and shaft at the other end;
wherein the reactionary end is a tab and the stationary end is a stop; and
said second spring compresses as movement means powers said arms to move and roll said tarp exposing contents within with said transport container; as said second spring reaches ninety degrees of rotational compression from its reactionary end starting point, said first spring compresses.

8. The tarping system as in claim 7 further comprises a remote control.

9. The tarping system as in claim 7 wherein the spring and shaft are contained within a housing.

10. The tarping system as in claim 7 wherein the tension of the spring is adjustable.

11. The tarping system as in claim 2 further comprises a remote control.

12. The tarping system as in claim 2 wherein the spring and shaft are contained within a housing.

13. The tarping system as in claim 2 wherein the tension of the spring is adjustable.

14. The tarping system as in claim 6 further comprises a remote control.

15. The tarping system as in claim 6 wherein the spring and shaft are contained within a housing.

16. The tarping system as in claim 6 wherein the tension of the spring is adjustable.

\* \* \* \* \*